United States Patent Office.

LOUIS BAUHŒFER, (HENRY HAUER, EXECUTOR,) OF PHILADELPHIA PENNSYLVANIA.

*Letters Patent No. 68,408, dated September 3, 1867.*

IMPROVED COMPOUND OF CORK, RUBBER, &c.

*The Schedule referred to in these Letters Patent and making part of the same.*

TO ALL WHOM IT MAY CONCERN:

Be it known that I, LOUIS BAUHŒFER, of Philadelphia, Pennsylvania, have invented a new Composition of Matter; and I do hereby declare the following to be a full, clear, and exact description of the same.

My invention consists of a composition of rubber or gutta percha and particles of cork which have been prepared substantially in the manner described in the Letters Patent granted to me on the sixth day of November, 1866, the composition thus formed being convertible into a variety of articles.

In order to enable others to make my invention, I will now proceed to describe the manner of carrying it into effect.

Cork is first prepared by baking or charring, as described in the Letters Patent granted to me on the sixth day of November, A. D. 1866. The cork is then granulated or ground, and sifted until no particles of dust or resinous matter remain, and is then mixed with pieces of India rubber or gutta percha, after which it is subjected to the action of heated rolls or jaws, until the rubber or gutta percha is reduced to a pasty condition, and intimately mixed and combined with the particles of cork. The composition may be rolled into sheets, from which wearing apparel, floor-cloths, or other articles may be manufactured, or it may be moulded to form car-springs or steam-packing, or may be cut into strips to form stuffing material, or otherwise utilized.

I have found that when cork is baked or charred, it becomes so soft and elastic that it will combine with India rubber or gutta percha, and form with the same an almost homogeneous composition, no ordinary tension being sufficient to detach the cork. Articles made of this composition are durable, impervious to moisture, and almost as elastic as those made of solid rubber, while they are much lighter and cheaper than the latter. The combination of the cork and rubber may be effected during the preparation of the latter for manufacturing purposes, and instead of softening the rubber by heat, it may be dissolved in a suitable solvent, or may be reduced to a pasty condition by macerating it in sulphide of carbon. Sulphur may also be mixed with the composition, so that the latter may be vulcanized if required. The cork may be granulated or ground in any suitable manner, and the pieces may be of any desired size.

Without confining myself to any particular manner of preparing or combining the materials, I claim as my invention, and desire to secure by Letters Patent—

A composition consisting of a combination of India rubber or gutta percha with particles of baked or charred cork, as set forth.

In testimony whereof I have signed my name to this specification in the presence of two subscribing witnesses.

LOUIS BAUHŒFER.

Witnesses:
  EDWARD WILLIAMS,
  HENRY HAUER.